United States Patent
Kwatra et al.

(10) Patent No.: US 12,444,414 B2
(45) Date of Patent: Oct. 14, 2025

(54) DYNAMIC VIRTUAL ASSISTANT SPEECH MODULATION

(71) Applicant: INTERNATIONAL BUSINESS MACHINES CORPORATION, Armonk, NY (US)

(72) Inventors: Shikhar Kwatra, San Jose, CA (US); Komminist Weldemariam, Ottawa (CA); Zachary A. Silverstein, Austin, TX (US); Victor Povar, Vancouver (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 17/247,414

(22) Filed: Dec. 10, 2020

(65) Prior Publication Data
US 2022/0189475 A1    Jun. 16, 2022

(51) Int. Cl.
| | |
|---|---|
| *G10L 15/22* | (2006.01) |
| *G06F 9/451* | (2018.01) |
| *G06N 3/08* | (2023.01) |
| *G10L 25/63* | (2013.01) |

(52) U.S. Cl.
CPC .............. *G10L 15/22* (2013.01); *G06F 9/453* (2018.02); *G06N 3/08* (2013.01); *G10L 25/63* (2013.01); *G10L 2015/225* (2013.01)

(58) Field of Classification Search
CPC ... G10L 15/22; G10L 25/63; G10L 2015/225; G10L 2015/223; G10L 15/1815; G10L 15/16; G06F 9/453; G06N 3/08

USPC .......................................................... 704/231
See application file for complete search history.

(56) References Cited

U.S. PATENT DOCUMENTS

| | | | |
|---|---|---|---|
| 8,275,621 B2 | 9/2012 | Alewine | |
| 9,812,151 B1* | 11/2017 | Amini | ...................... G06T 13/40 |
| 11,302,312 B1* | 4/2022 | Soni | ........................ G10L 15/07 |
| 2003/0191645 A1 | 10/2003 | Zhou | |
| 2008/0147408 A1 | 6/2008 | Da Palma | |
| 2009/0006097 A1* | 1/2009 | Etezadi | .................... G10L 13/08 |
| | | | 704/277 |
| 2012/0166180 A1 | 6/2012 | Au | |
| 2012/0173241 A1* | 7/2012 | Li | ............................ G10L 13/10 |
| | | | 704/260 |
| 2013/0289998 A1* | 10/2013 | Eller | ........................ G10L 13/08 |
| | | | 704/260 |
| 2014/0122083 A1 | 5/2014 | Xiaojiang | |

(Continued)

OTHER PUBLICATIONS

Anonymous, "Accelerate change to smarter vehicles of the future with AI and IoT," IBM.com, [accessed on Jul. 7, 2020], 8 pages, Retrieved from the Internet: <URL: https://www.ibm.com/internet-of-things/explore-iot/vehicles>.

(Continued)

*Primary Examiner* — Richemond Dorvil
*Assistant Examiner* — Rodrigo A Chavez
(74) *Attorney, Agent, or Firm* — Rakesh Roy (57) ABSTRACT

A method, computer system, and a computer program product for dynamic speech modulation is provided. The present invention may include transmitting a first response to a received command. The present invention may include determining the first response is not understood by a user. The present invention may include transmitting a second response to the received command.

12 Claims, 5 Drawing Sheets

(56) References Cited

U.S. PATENT DOCUMENTS

| | | |
|---|---|---|
| 2014/0122407 A1 | 5/2014 | Duan |
| 2016/0293159 A1* | 10/2016 | Belisario ................. G10L 15/28 |
| 2016/0307569 A1* | 10/2016 | Peng ....................... G10L 15/26 |
| 2018/0174577 A1* | 6/2018 | Jothilingam .......... G10L 13/033 |
| 2018/0196796 A1* | 7/2018 | Wu ....................... G06F 40/289 |
| 2018/0218750 A1* | 8/2018 | Nichkawde ........... G06F 40/169 |
| 2018/0268309 A1* | 9/2018 | Childress .............. G06F 40/237 |
| 2019/0189116 A1* | 6/2019 | Li ........................ G10L 15/1822 |
| 2019/0325864 A1* | 10/2019 | Anders .................... G10L 15/19 |
| 2020/0082806 A1* | 3/2020 | Kim ......................... G06N 3/04 |
| 2020/0126536 A1* | 4/2020 | Farivar .................. G10L 15/08 |
| 2020/0251014 A1* | 8/2020 | Jones ..................... G09B 15/04 |
| 2020/0286467 A1* | 9/2020 | Chao ..................... G10L 15/183 |
| 2020/0286473 A1* | 9/2020 | Anders ................... G10L 15/22 |
| 2020/0380882 A1* | 12/2020 | Alailima .............. A61B 5/4836 |
| 2020/0387603 A1* | 12/2020 | Weldemariam .......... G06N 3/08 |
| 2021/0065702 A1* | 3/2021 | Fink .................. G06F 16/90332 |
| 2021/0120206 A1* | 4/2021 | Liu ............................ G06F 9/54 |
| 2021/0160373 A1* | 5/2021 | Mcgann .............. H04M 3/5175 |
| 2021/0295826 A1* | 9/2021 | Morabia ............... H04L 51/046 |
| 2022/0122581 A1* | 4/2022 | Chen ..................... G06N 3/047 |
| 2022/0189475 A1* | 6/2022 | Kwatra ................... G10L 25/63 |
| 2022/0284882 A1* | 9/2022 | Peddinti ................ G10L 15/187 |
| 2022/0293124 A1* | 9/2022 | Weinberg ............ G10L 15/1807 |

OTHER PUBLICATIONS

Disclosed Anonymously, "Matching language and accent in virtual assistant responses," IP.com, Jun. 14, 2014, 5 pages, IP.com No. IPCOM000254265D.

Genhart, "Google Home vs. Amazon Echo, round 2: Google strikes back," CNET.com, May 18, 2017 [accessed on Jul. 7, 2020], 15 pages, Retrieved from the Internet: <URL: https://www.cnet.com/news/google-home-vs-amazon-echo/>.

Jesdanun, "How Amazon Echo listens and what it stores," Phys.org, Dec. 29, 2016 [accessed on Jul. 7, 2020], 3 pages, Retrieved from the Internet: <URL: https://phys.org/news/2016-12-amazon-echo.html#jCp>.

Mell, et al., "The NIST Definition of Cloud Computing", National Institute of Standards and Technology, Special Publication 800-145, Sep. 2011, 7 pages.

* cited by examiner

DYNAMIC VIRTUAL ASSISTANT SPEECH MODULATION

BACKGROUND

The present invention relates generally to the field of computing, and more particularly to voice assistants.

A voice-controlled multimedia device (e.g., a voice assistant) may communicate with a connected server to process a voice request (e.g., a user command). A voice assistant may tie communications to a random identifier, or to an associated account, among other things, and may extend usage beyond audio playback, including features such as compatibility across a number of services and platforms, peer-to-peer connection through mesh networking, and/or intelligent personal assistants, among other things.

SUMMARY

Embodiments of the present invention disclose a method, computer system, and a computer program product for dynamic speech modulation. The present invention may include transmitting a first response to a received command. The present invention may include determining the first response is not understood by a user. The present invention may include transmitting a second response to the received command.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic speech modulation. As such, the present embodiment has the capacity to improve the technical field of voice assistants by dynamically modifying a response of a voice assistant to increase a user's satisfaction with and understanding of responses issued by the voice assistant. More specifically, the present invention may include transmitting a first response to a received command. The present invention may include determining the first response is not understood by a user. The present invention may include transmitting a second response to the received command.

As described previously, a voice-controlled multimedia device (e.g., a voice assistant) may communicate with a connected server to process a voice request (e.g., a user command). A voice assistant may tie communications to a random identifier, or to an associated account, among other things, and may extend usage beyond audio playback, including features such as compatibility across a number of services and platforms, peer-to-peer connection through mesh networking, and/or intelligent personal assistants, among other things.

However, a voice assistant may provide responses to a user's commands which are not understood by the user based on a pronunciation by the voice assistant.

Therefore, it may be advantageous to, among other things, enable the voice assistant to learn a user's language, pronunciation, and/or accent models in order to accommodate a user command appropriately.

According to at least one embodiment, the present invention may enable the voice assistant to understandably provide a response to the user based on learning the user's pronunciation and/or accent, including from the user's identified geography and/or cultural group.

According to at least one embodiment, the present invention may dynamically understand content heard by the voice assistant and may modify a pronunciation of a response to the user to make the spoken context understandable by the user.

According to at least one embodiment, the present invention may dynamically control and/or switch a pronunciation model to increase a user's satisfaction with a voice-controlled multimedia device (e.g., a voice assistant) based on a predicted pronunciation and an analysis of context and content.

According to at least one embodiment, the present invention may include a smart speaker device with a microphone array and a means for connecting the device to a voice-controlled multimedia device (e.g., a voice assistant, an intelligent personal assistant). The present invention may predict, including based on the user's prior communication with the smart speaker device (e.g., the voice assistant), a user's pronunciation difficulty, and may facilitate understanding by the user by dynamically adjusting a pronunciation model (e.g., how the system knows to pronounce a word) based on a pronunciation switching factor (e.g., a factor which influences a prediction and is based on a user's understanding and/or language basis, among other things). Predicting the user's pronunciation difficulty may include utilizing a linguistic model (e.g., known pronunciations) of previous failed attempts (e.g., instances in which a user has had difficulty understanding a voice assistant) to determine that words within a specific domain (e.g., from a particular language and/or a concept or idea) are not easily understood by the user. Outputted responses may be proactively modified based on a prediction.

According to at least one embodiment, the present invention may perform an analysis of a user's voice command to establish a user profile (e.g., to identify a user) and to infer a comprehension level of the user (e.g., a level of user understanding based on the pronunciation by a voice assistant). The comprehension level of the user may be matched with a predicted response by a voice assistant. The predicted response may be generated based on cognitive user features, including the comprehension level of the user, a frustration level of the user (e.g., based on a comprehension difficulty), and/or an analysis of content requested by the user (e.g., based on a user command).

According to at least one embodiment, the present invention may utilize a machine learning model, trained using a plurality of user data, including historical pronunciation and/or accent data, user profile information (e.g., a comprehension level of the user), a context of a user's command, historical multimedia preferences, and/or Internet of Things (IoT) data, among other user data.

According to at least one embodiment, the present invention may be trained, through analysis of user pronunciation, identity and/or profile information, as well as an analysis of a user command, to recognize sound(s) associated with a user's frustration and/or need for granular information, and may proactively alleviate a user's frustration by accommodating the user command more appropriately.

Figure 1:
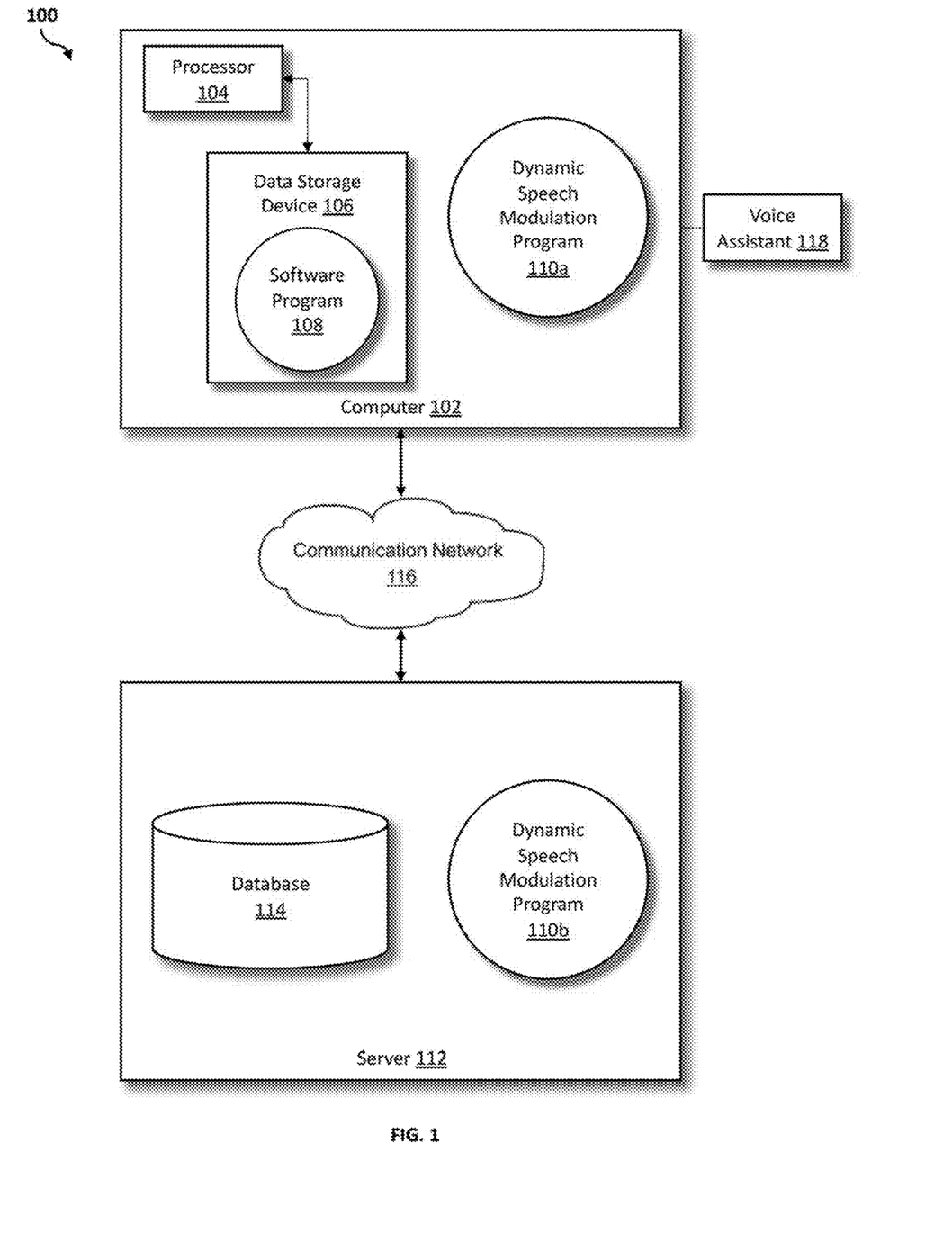
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic speech modulation program 110a. The networked computer environment 100 may also include a server 112 that is enabled to run a dynamic speech modulation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The voice assistant 118 is depicted as shown as its own separate entity but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the dynamic speech modulation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic speech modulation program 110a, 110b (respectively) to dynamically modifying a response of a voice assistant to increase a user's satisfaction with and understanding of responses issued by the voice assistant. The dynamic speech modulation method is explained in more detail below with respect to FIG. 2.

Figure 2:
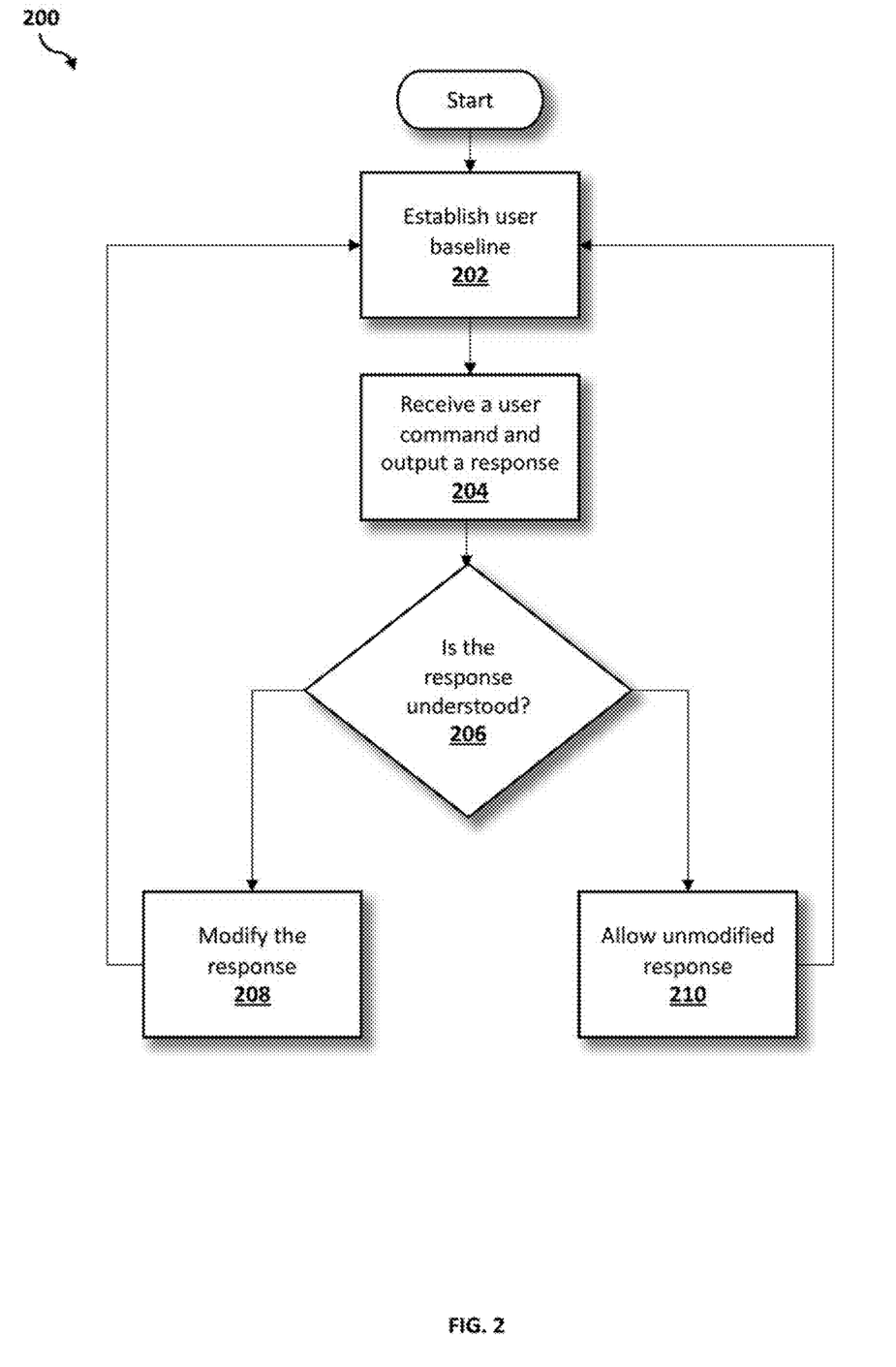
FIG. 2 is an operational flowchart illustrating a process for dynamic speech modulation according to at least one embodiment.

Referring now to FIG. 2, an operational flowchart illustrating the exemplary dynamic speech modulation process 200 used by the dynamic speech modulation program 110a and 110b according to at least one embodiment is depicted.

At 202, a user baseline is established. The dynamic speech modulation program 110a, 110b may be integrated with a voice-controlled multimedia device (e.g., a voice assistant) which may utilize Bluetooth® (Bluetooth and all Bluetooth-based trademarks and logos are trademarks or registered trademarks of Bluetooth SIG, Inc. and/or its affiliates), WiFi, radio, and/or other method of communication which may enable data to be transmitted (e.g., a signal, a stream of video) to communicate with a connected server to process a voice request (e.g., a user command).

A voice assistant may tie communications to a random identifier, or to an associated account, among other things, and may extend usage beyond audio playback, including features such as compatibility across a number of services and platforms, peer-to-peer connection through mesh networking, and/or intelligent personal assistants, among other things.

A user baseline (e.g., a starting point which may be used for later comparison purposes) may be established within a user profile of the dynamic speech modulation program 110a, 110b. The user profile may be generated by and accessed by the user and may include information specified by the user as well as information learned about the user by the dynamic speech modulation program 110a, 110b and saved in the user's profile.

The user profile may include user-inputted information such as a native accent of the user, a default language, and a location of the voice assistant. The user profile may also include an accent analysis performed by the dynamic speech modulation program 110a, 110b using audio data gathered by the voice assistant.

The user baseline may be established based on an analysis of all information included in the user profile. An algorithm for calculating the user baseline may include giving more or less weight to certain information based on a perceived frustration of the user (e.g., a baseline frustration level may be included in the user profile and may be based on historical information of the user) and/or a comparison of the user baseline to other users with similar user profile information, based on an analysis of past user satisfaction. User satisfaction may be determined dynamically, using a sentiment analysis API and/or a tone analyzer API, based on continuous monitoring of the user's frustration level and/or reaction to responses provided by the voice assistant.

Raw speech stream data collected by the voice assistant may be passed through a speech to text processor such as IBM's Watson™ (Watson and all Watson-based trademarks are trademarks or registered trademarks of International Business Machines Corporation in the United States, and/or other countries) speech to text so that the content may be analyzed with natural language processing (NLP) algorithms. NLP algorithms such as Watson™ tone analyzer (e.g., to dynamically determine a satisfaction or frustration level of a user) and sentiment analysis (e.g., to determine whether a user is temperamental, angry, disappointed, sad, or happy, among other things) application programming interfaces (API's) as well as Watson™ natural language classifier (e.g., to gather speech content and keyword indicator data) may be used.

For example, a user may initiate a voice assistant and begin issuing commands. The user's baseline may be established based on information contained within the user's profile, which has been supplied both by the user and gathered by the dynamic speech modulation program 110a, 110b (e.g., and analyzed using application programming interfaces such as those described above).

At 204, a user command is received by the dynamic speech modulation program 110a, 110b and a response is outputted to the user. Once a user command is issued to the voice assistant, the voice assistant may query a knowledgebase (e.g., a cloud-based knowledgebase associated with the particular voice assistant) which may return information relevant to the user command (e.g., by using Mel-frequency cepstral coefficient (MFCC) feature extraction). The knowledgebase may be specific to the voice assistant used by the user (e.g., the knowledgebase may be an online database maintained by the creator of the voice assistant which supplies information to the voice assistant).

The information returned to the user may have corresponding metadata which may be captured by the dynamic speech modulation program 110a, 110b. The corresponding metadata may include foreign characters and an associated language, a context of the user's command, and/or a derived content of the user's command. The metadata may be derived to analyze content (e.g., the user command) for language and/or accent information.

Metadata may include, for example, a language that the user command is spoken and/or written in (e.g., for audio and/or written content), foreign characters and grammatical syntaxes (e.g., in the user command), country data (e.g., whether a content creator for data relating to the user command is located in a country other than the user's country based on information supplied by the user and/or a determined location of the voice assistant), pronunciation information (e.g., global pronunciation information found by a web scraper), and/or a content category (e.g., a category of the user command). Metadata may include user-specific information such as, for example, how an accent change should be made, if at all.

Continuing with the example from step 202 above, the user issues the following command to the voice assistant, "please tell me which song is playing now." The voice assistant responds by saying, "you are listening to Hawayein from the movie 'Jab we met,'" to which the user states, "I did not understand this." Here, by using the commands issued by both the user and the voice assistant as data, the dynamic speech modulation program 110a, 110b may detect the origin of the requested song by performing NLP feature extraction of the command spoken by the user. The dynamic speech modulation program 110a, 110b may further dynamically fetch the profile of the user based on Mel-frequency cepstral coefficient (MFCC) feature extraction of the user command and may match the user command to the repository maintained for the user in a cloud database. This may enable the dynamic speech modulation program 110a, 110b to determine (e.g., fetch) languages known to the user.

At 206, the dynamic speech modulation program 110a, 110b determines whether the outputted response is understood by the user. The dynamic speech modulation program 110a, 110b may determine whether the response, or a portion thereof, requires an accent modification by analysis of whether the user has a low threshold for understanding (e.g., based on the user's previous rate of understanding), and/or whether the response is complex.

The dynamic speech modulation program 110a, 110b may determine that a response is complex by assigning a score based on a degree of difference from a non-default language (e.g., a level of statistical significance based on phonemes used in the response), by determining whether the language of the response differs significantly (e.g., based on a test of statistical significance, including a calculated z-score, among other things) from the user's default (e.g., in instances where the requested response is in a different language than the user's default language), and/or by determining whether a language sampling for the response is returned with lower confidence than a base threshold (e.g., a minimum confidence).

A base threshold (e.g., a default threshold) may default to 100 in a newly created user profile and may be adjusted based on learning performed by the dynamic speech modulation program 110a, 110b. For example, if, based on communication between the user and the voice assistant, the dynamic speech modulation program 110a, 110b determines that the user's comprehension of unmodified complex responses is at a rate of 50%, then the base threshold for the user may decrease to 50% in the user profile. Since this number is equal to the comprehension by the user without any modification of a response issued by the voice assistant, the dynamic speech modulation program 110a, 110b may seek to ensure that a modified response exceeds the base threshold. The base threshold may be ever changing based on changes in comprehension by the user and may be dynamically updated based on learning performed by the dynamic speech modulation program 110a, 110b.

The confidence score may be locally stored and/or tracked at the cloud level depending on an implementation choice of the user (e.g., within a user profile).

The dynamic speech modulation program 110a, 110b may further determine that a response is not understood by the user (e.g., that the user has comprehension issues and/or a comprehension difficulty) based on a detection of user vocalizations such as "huh" and "repeat," and further based on a detection of user expression such as confusion (e.g., in instances where a connected camera may be used to capture user data).

The dynamic speech modulation program 110a, 110b may maintain a historical database of the user's pronunciations (e.g., a pronunciation model maintained in the user profile) and may predict a usage and/or a pronunciation of certain words and/or terms based on past conversation. A long short-term memory (LSTM) recurrent neural network (RNN) may take into account pattern history of the user as same relates to tone modulation and/or feedback associated with different words, among other things, to determine whether an outputted response is understood by the user.

If, at 206, it is determined that the outputted response is not understood by the user, then at 208, the dynamic speech modulation program 110a, 110b modifies the outputted response. Modifying a response may include modifying an accent used by the voice assistant (e.g., to an accent known to be understood by the user, based on past interaction data between the user and the voice assistant) as well as feeding the data back into the dynamic speech modulation program 110a, 110b for use in updating the user baseline.

Modifying a response may include applying a native language accent overlay on the response issued by the voice assistant and feeding the data back into the user profile. For example, if the dynamic speech modulation program 110a, 110b learns that the user pronounces a word (e.g., a place, an object, and/or a thing) in a certain way and includes the user's pronunciation in the user's profile, then based on the information in the user's profile, the user's native accent may be used to replace the word in an output made by the voice assistant while keeping a remainder of the output unmodified.

Continuing with the above example, the dynamic speech modulation program 110a, 110b uses a long short-term memory (LSTM) recurrent neural network (RNN) to determine that the outputted response was not understood by the user based on both the user's tone of voice and the use of the phrase "I did not understand this." The dynamic speech modulation program 110a, 110b tags the user response and corresponding response by the voice assistant with high level and granular details pertaining to the request. This may be done by gathering a name of the media content being played, fetching the category of the media content (e.g., Bollywood music, Hollywood, etc.) from a connected account (e.g., the user's connected account which may be connected to a knowledgebase of the voice assistant, among other things), dividing and separating the audio file into chunks of buffered voice features to input into a LSTM sentence buffer engine, and correlating the features being extracted from the buffered media content to match languages being used in the media content.

Based on the above, the dynamic speech modulation program 110a, 110b determines that the content of the response included a song name popular in a geographic location other than the geographic location of the user, and asks the user, "do you know what 'Hawayein' is?" This conversation between the user and the voice assistant provides the dynamic speech modulation program 110a, 110b with additional data about the user's accent and pronunciation, and further enables the dynamic speech modulation program 110a, 110b to correlate the user data to determine an appropriate pronunciation variation (e.g., by using cosine similarity to identify a difference in syllables and/or speech features and to align the identified metrics with an appropriate pronunciation version). For example, a correlation may be based on pronunciation based on a user's demographic and/or native accent.

If, at 206, it is determined that the outputted response is understood by the user, then at 210, the unmodified response is allowed. However, even in instances where no modification of the response may be required, connected IoT sources may continue gathering data from the user's interaction with the voice assistant and the gathered data may be fed back into the user profile for use in updating the user baseline.

It may be appreciated that FIG. 2 provide only an illustration of one embodiment and do not imply any limitations with regard to how different embodiments may be implemented. Many modifications to the depicted embodiment(s) may be made based on design and implementation requirements.

Figure 3:
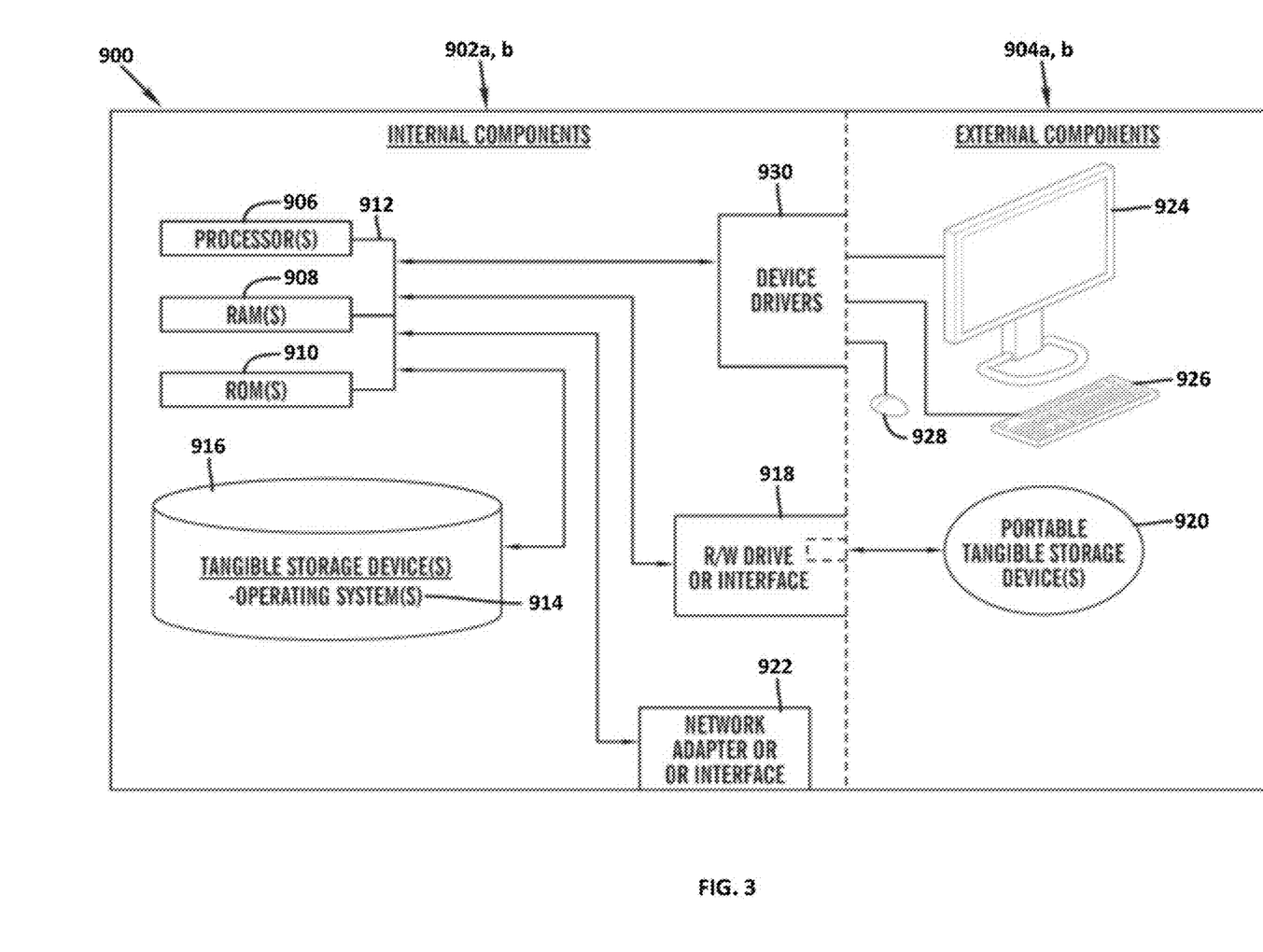
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the dynamic speech modulation program 110a in client computer 102, and the dynamic speech modulation program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic speech modulation program 110a and 110b can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic speech modulation program 110a in client computer 102 and the dynamic speech modulation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic speech modulation program 110a in client computer 102 and the dynamic speech modulation program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
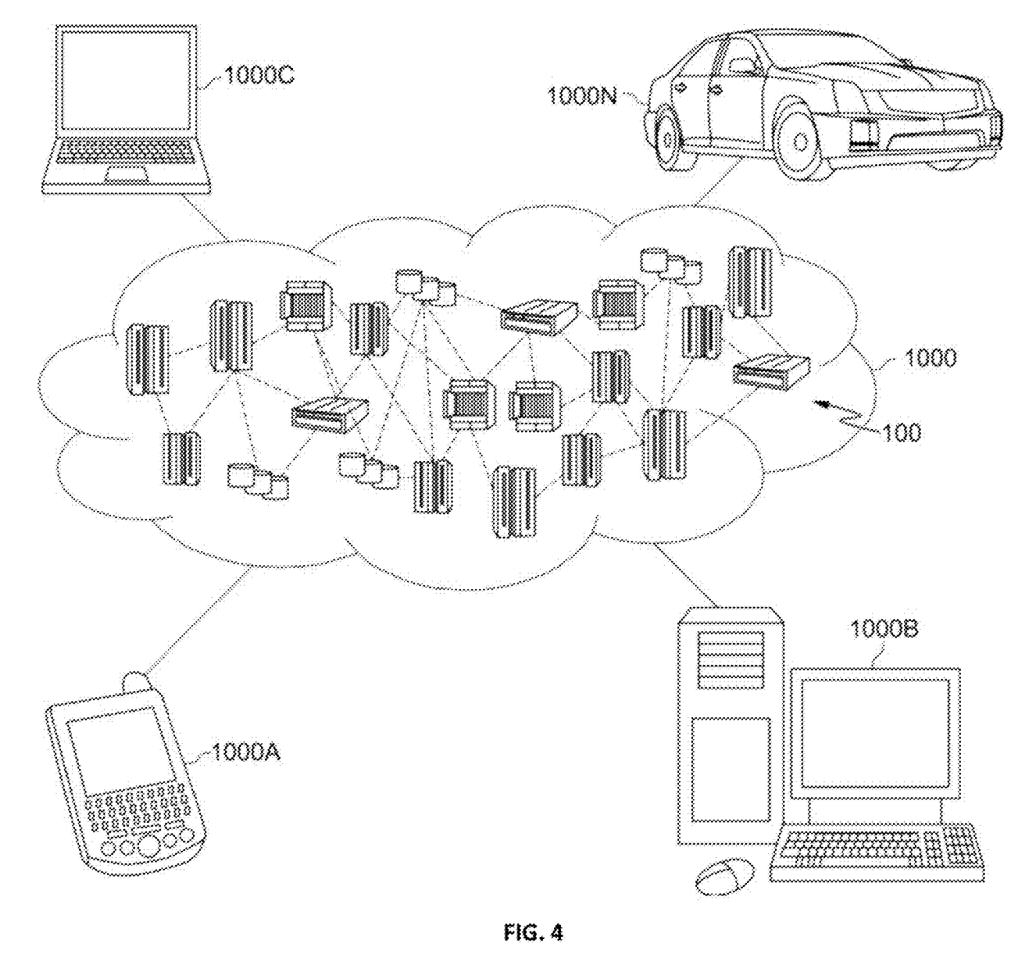
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
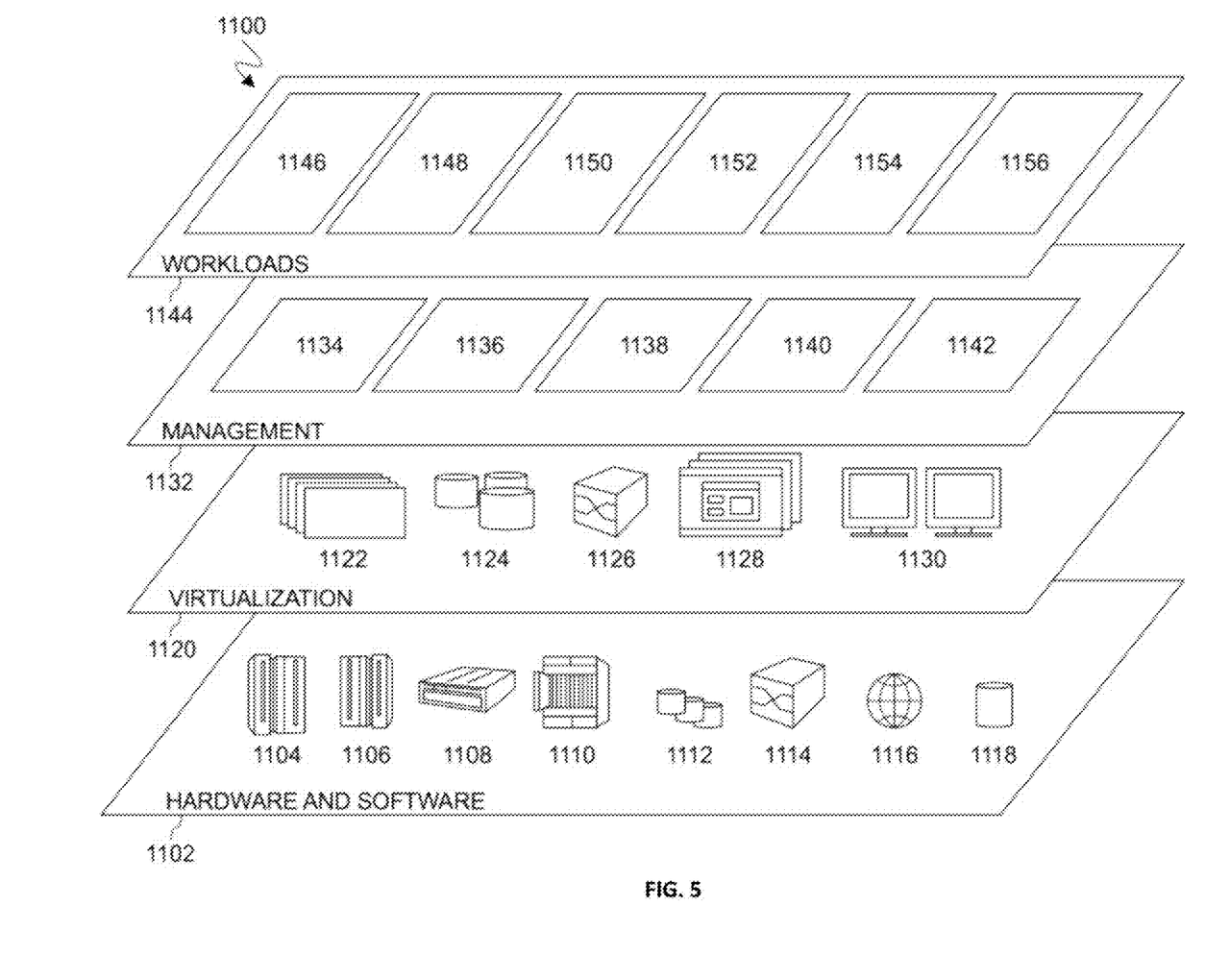
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic speech modulation 1156. A dynamic speech modulation program 110a, 110b provides a way to dynamically modifying a response of a voice assistant to increase a user's satisfaction with and understanding of responses issued by the voice assistant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for dynamic speech modulation, the method comprising:

extracting, by a digital voice assistant, Mel-frequency cepstral coefficient (MFCC) features from a received audio command from a user to identify the user and a corresponding user profile based on the MFCC features, wherein the corresponding user profile stores a default language of the user and one or more user pronunciation models learned by the digital voice assistant based on analysis of user pronunciations;

generating, by the digital voice assistant, a first response to the received audio command, wherein the first response includes a first pronunciation associated with a different language than the default language of the user;

sampling, by the digital voice assistant, the first response to determine whether the first response will be understood by the user based on a comprehension level of the user associated with the different language in the first response, wherein the comprehension level of the user is identified in the corresponding user profile, and wherein the comprehension level is dynamically set by the digital voice assistant based on learning a user comprehension rate for one or more prior unmodified responses from the digital voice assistant; and in response to determining, by the digital voice assistant, that the first response includes a lower confidence score than the comprehension level of the user, performing a cosine similarity to identify at least one speech feature in the first pronunciation of the first response that is different relative to the one or more user pronunciation models learned by the digital voice assistant, modifying the at least one speech feature in the first pronunciation of the first response to align the first pronunciation with the one or more user pronunciation models learned by the digital voice assistant, and transmitting to the user, by the digital voice assistant, a second response to the received audio command generated based on the one or more user pronunciation models, wherein the second response includes a higher confidence score than the comprehension level of the user.

2. The method of claim 1, further comprising:

transmitting to the user, by the digital voice assistant, the first response to the received audio command to determine whether the first response will be understood by the user; and determining that the first response transmitted to the user is not understood by the user based on determining, by the digital voice assistant executing a sentiment analysis application programming interface (API) and a tone analysis API on a user response to the first response, that a frustration level of the user exceeds a baseline frustration level.

3. The method of claim 1, further comprising:

using a long short-term memory (LSTM) recurrent neural network (RNN), trained using historical user data including pronunciation data, accent data, and the corresponding user profile, to predict a comprehension difficulty of the user.

4. The method of claim 1, further comprising:

updating the one or more user pronunciation models based on a perceived understanding of the second response by the user.

5. A computer system for dynamic speech modulation, comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

extracting, by a digital voice assistant, Mel-frequency cepstral coefficient (MFCC) features from a received audio command from a user to identify the user and a corresponding user profile based on the MFCC features, wherein the corresponding user profile stores a default language of the user and one or more user pronunciation models learned by the digital voice assistant based on analysis of user pronunciations;

generating, by the digital voice assistant, a first response to the received audio command, wherein the first response includes a first pronunciation associated with a different language than the default language of the user;

sampling, by the digital voice assistant, the first response to determine whether the first response will be understood by the user based on a comprehension level of the user associated with the different language in the first response, wherein the comprehension level of the user is identified in the corresponding user profile, and wherein the comprehension level is dynamically set by the digital voice assistant based on learning a user comprehension rate for one or more prior unmodified responses from the digital voice assistant; and in response to determining, by the digital voice assistant, that the first response includes a lower confidence score than the comprehension level of the user, performing a cosine similarity to identify at least one speech feature in the first pronunciation of the first response that is different relative to the one or more user pronunciation models learned by the digital voice assistant, modifying the at least one speech feature in the first pronunciation of the first response to align the first pronunciation with the one or more user pronunciation models learned by the digital voice assistant, and transmitting to the user, by the digital voice assistant, a second response to the received audio command generated based on the one or more user pronunciation models, wherein the second response includes a higher confidence score than the comprehension level of the user.

6. The computer system of claim 5, further comprising:

transmitting to the user, by the digital voice assistant, the first response to the received audio command to determine whether the first response will be understood by the user; and determining that the first response transmitted to the user is not understood by the user based on determining, by the digital voice assistant executing a sentiment analysis application programming interface (API) and a tone analysis API on a user response to the first response, that a frustration level of the user exceeds a baseline frustration level.

7. The computer system of claim 5, further comprising:

using a long short-term memory (LSTM) recurrent neural network (RNN), trained using historical user data including pronunciation data, accent data, and the corresponding user profile, to predict a comprehension difficulty of the user.

8. The computer system of claim 5, further comprising:

updating the one or more user pronunciation models based on a perceived understanding of the second response by the user.

9. A computer program product for dynamic speech modulation, comprising:

one or more non-transitory computer-readable storage media and program instructions stored on at least one of the one or more non-transitory computer-readable storage media, the program instructions executable by a processor to cause the processor to perform a method comprising:

extracting, by a digital voice assistant, Mel-frequency cepstral coefficient (MFCC) features from a received audio command from a user to identify the user and a corresponding user profile based on the MFCC features, wherein the corresponding user profile stores a default language of the user and one or more user pronunciation models learned by the digital voice assistant based on analysis of user pronunciations;

generating, by the digital voice assistant, a first response to the received audio command, wherein the first response includes a first pronunciation associated with a different language than the default language of the user;

sampling, by the digital voice assistant, the first response to determine whether the first response will be understood by the user based on a comprehension level of the user associated with the different language in the first response, wherein the comprehension level of the user is identified in the corresponding user profile, and wherein the comprehension level is dynamically set by the digital voice assistant based on learning a user comprehension rate for one or more prior unmodified responses from the digital voice assistant; and in response to determining, by the digital voice assistant, that the first response includes a lower confidence score than the comprehension level of the user, performing a cosine similarity to identify at least one speech feature in the first pronunciation of the first response that is different relative to the one or more user pronunciation models learned by the digital voice assistant, modifying the at least one speech feature in the first pronunciation of the first response to align the first pronunciation with the one or more user pronunciation models learned by the digital voice assistant, and transmitting to the user, by the digital voice assistant, a second response to the received audio command generated based on the one or more user pronunciation models, wherein the second response includes a higher confidence score than the comprehension level of the user.

10. The computer program product of claim 9, further comprising:

transmitting to the user, by the digital voice assistant, the first response to the received audio command to determine whether the first response will be understood by the user; and determining that the first response transmitted to the user is not understood by the user based on determining, by the digital voice assistant executing a sentiment analysis application programming interface (API) and a tone analysis API on a user response to the first response, that a frustration level of the user exceeds a baseline frustration level.

11. The computer program product of claim 9, further comprising:

using a long short-term memory (LSTM) recurrent neural network (RNN), trained using historical user data including pronunciation data, accent data, and the corresponding user profile, to predict a comprehension difficulty of the user.

12. The computer program product of claim 9, wherein the one or more user pronunciation models is updated based on a perceived understanding of the second response by the user.

\* \* \* \* \*